United States Patent

[11] 3,571,717

[72] Inventor Jean L. Monrolin
Les-Hauts-De-Camassade, France
[21] Appl. No. 764,253
[22] Filed Oct. 1, 1968
[45] Patented Mar. 23, 1971
[73] Assignee International Business Machines Corporation
Armonk, N.Y.
[32] Priority Oct. 6, 1967
[33] France
[31] 8733(AM)

[54] DUAL PILOT CONTROL FOR RE-PHASING A SIGNAL CARRIER
3 Claims, 12 Drawing Figs.

[52] U.S. Cl. ........ 325/329, 325/49, 325/50
[51] Int. Cl. ........ H04b 1/68
[50] Field of Search ........ 328/155; 178/69.5; 325/4, 49, 50, 63, 65, 137, 138, 329, 418; 179/15, 15 (B), 15.15, 15.77

[56] References Cited
UNITED STATES PATENTS

| | | | |
|---|---|---|---|
| 3,102,164 | 8/1963 | Roiz | 178/69.5 |
| 3,182,259 | 5/1965 | Holder | 325/50 |
| 3,196,352 | 7/1965 | Hopner et al. | 325/49 |
| 3,202,765 | 8/1965 | Byrne | 179/15 |

FOREIGN PATENTS

| | | | |
|---|---|---|---|
| 480,847 | 3/1938 | Great Britain | 325/138 |

*Primary Examiner*—Robert L. Griffin
*Assistant Examiner*—Benedict V. Safourek
*Attorney*—Hanifin and Janein

ABSTRACT: In a communication system transmitting both the lower sideband of a modulated signal and the carrier, the phase shift of the recovered carrier relative to the signal spectrum can be adjusted to improve signal demodulation. Two pilot frequencies, one higher than and one lower than the signal frequencies to be transmitted and having a known phase relationship are mixed with the signal for modulation by the carrier and transmission. In the receiver, the signal is demodulated with a recovered carrier signal and the pilot frequencies are phase compared to determine the magnitude and direction of their relative phase shift. The recovered carrier signal is then phase shifted to reduce the relative phase shift of the pilot frequencies to within a limited range.

PATENTED MAR 23 1971 3,571,717

SHEET 8 OF 9

DUAL PILOT CONTROL FOR RE-PHASING A SIGNAL CARRIER

INTRODUCTION

This invention relates to the regulation of phase of a regenerated carrier signal in a single sideband transmission system to enable an effective recovery of the transmitted signal. It is known that for any given passband in a transmission system, the variation of phase of a signal frequency with respect to a carrier signal is a function of the frequency of the signal, or, at least, the variation of the frequency-phase ratio as a function of the signal frequency, may, on first approximation, be considered to be linear over the more important central part of the passband. The transmitted carrier, being on the fringe of the information part of the band, is located in the more disturbed zone and may have a substantial phase shift relative to the information signals. To obtain correct signal demodulation, it is desirable to regulate the phase of a regenerated carrier before applying it to the demodulator, so that everything is proceeding as if it were in the linear domain. Various methods are used to this end.

One object of the invention is to provide structure to adjust the phase of a regenerated signal carrier, under control of the relative delay between two transmitted components of the signal, so that the magnitude of the delay is zero or at least lower than a given value.

Another object of the invention is to implement the structure of such device in an economical and efficient embodiment.

The foregoing and other objects, features and advantages of the invention will be apparent from the following more particular description of preferred embodiments of the invention, as illustrated in the accompanying drawings.

DRAWINGS

In the drawings:

FIG. 1*a* represents an idealized passband spectrum;

FIG. 1*b* represents the delay variation over the passband as a function of the frequency;

FIG. 1*c* represents the delay introduced by phase variations of the demodulating carrier signal;

FIG. 1*d* represents the frequency spectrum of the transmitted signal;

FIG. 2 is a schematic representation of a device according to the invention;

FIG. 3 gives an example of a data signal and various related signals;

FIG. 4 is a more detailed representation of the embodiment of FIG. 2;

FIGS. 5*a* and 5*b* represent timing relationships between signals for different phasing conditions;

FIG. 6 is another embodiment of the invention; and

FIGS. 7*a* and 7*b* represent timing relationships between signals in the embodiment of FIG. 6.

DETAILED DESCRIPTION

Figure 1A:
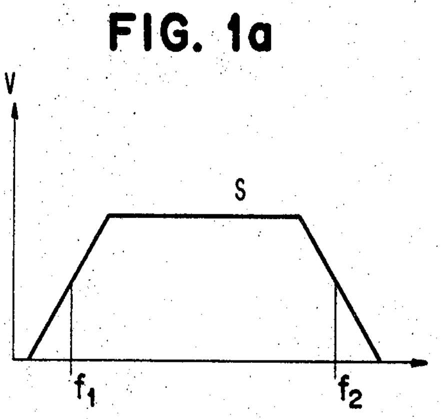
Figure 1B:
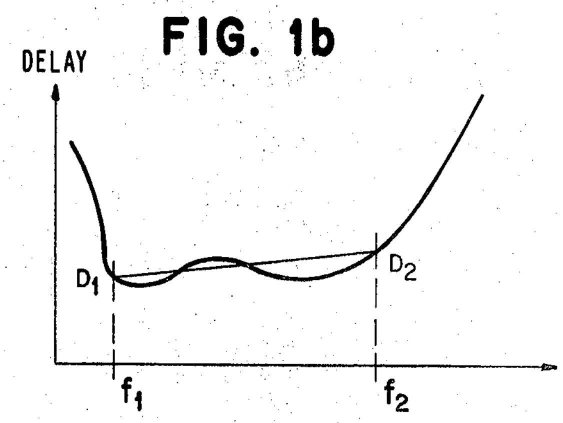
Figure 1C:
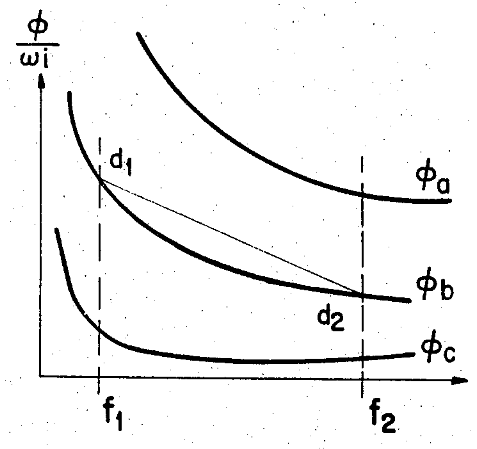
Figure 1D:
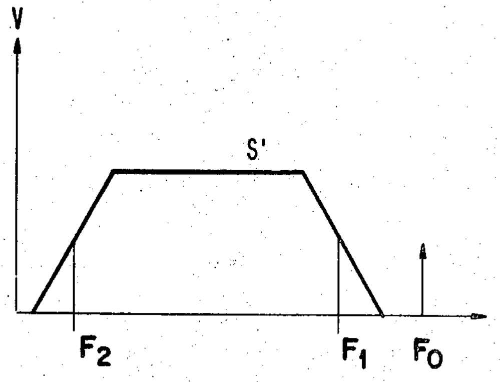

FIG. 1*a* represents a spectrum S to be transmitted with two reference frequencies $f_1$ and $f_2$, preferably selected so that: $f_2$=a[$f_1$. FIG. 1*d* shows the signal which will be transmitted (lower sideband after modulation), including the carrier (or any group of signals allowing the carrier to be determined at the receiver). The spectrum S′ of FIG. 1*d* is equal to S of FIG. 1*a* as shifted by modulation with the carrier. At the receiving end, after demodulation with the received carrier, we recover an S*r* substantially equal to S, except for some effects due to differential phase shifts. FIG. 1*b* gives representative residual delays of a received spectrum S*r*, due to the phase shifts during transmission of the frequencies F of S′.

In the initial signal, we find the components: $a_1 \sin \omega_1 t$ and $a_2 \sin(\omega_2 t+k)$. At transmission, through modulation by carrier $A_0 \sin \Omega_0 t$, one has:

$A_1 \cos(\Omega_0-\omega_1)t = A_1 \cos \Omega_1 t.$ $A_2 \cos[(\Omega_0-\omega_2)t-k] = A_2 \cos(\Omega_2 t-k).$ At the receiver after a frequency sensitive phase shift, the signals become:

$A_1 \cos(\Omega_1 t+\Phi_1).$ $A_2 \cos(\Omega_2 t-+\Phi_2).$ and the carrier is recovered as $A_0 \sin(\Omega_0 t+\Phi_0).$ After demodulation of the signals by the carrier, the resulting signals are:

$$\frac{A_0A_1}{2}\sin[(\Omega_0-\Omega_1)t+\phi_0-\phi_1]=\frac{A_0A_1}{2}\sin(\omega_1 t+\phi_0-\phi_1)$$

and $$\frac{A_0A_2}{2}\sin[(\Omega_0-\Omega_2)t-k+\phi_0-\phi_2]$$

$$=\frac{A_0A_2}{2}\sin(\omega_2 t-k+\phi_0-\phi_2)$$

The phase delay due to transmission is, as shown in FIG. 1*b*:

$$D_1=\frac{\phi_0-\phi_1}{\omega_1}$$

$$D_2=\frac{\phi_0-\phi_2}{\omega_2}$$

or generally $$Di=\frac{\phi_0-\phi_i}{\omega_i}$$

If an arbitrary phase shift $\Phi(a,b,c\ldots)$ is added to the carrier signal before it is used in demodulation we have:

$$\frac{A_0A_1}{2}\sin\omega_1\left[t+D1+\frac{\phi}{\omega_1}\right]$$

$$\frac{A_0A_2}{2}\sin\omega_2\left[t+\frac{k}{\omega_2}+D2+\frac{\phi}{\omega_2}\right]$$

The curves 1*c* show the values of delay $$di=\frac{\phi}{\Omega_0-\Omega_1}=\frac{\phi}{\omega_i}$$

for various values of $\Phi$.

In the range of frequencies from $f_1$ to $f_2$, the phase delay D*i*, FIG. 1*b*, may be closely approximated by the straight line from *D*1 to *D*2, FIG. 1*b*. By selecting a carrier phase shift $\Phi$, FIG. 1*c*, the straight line from $d_1$ to $d_2$ approximating the phase delay due to carrier phase shift can be adjusted to the negative of the slope of the line of FIG. 1*b*. Demodulation of the received signal by such a selected carrier will largely eliminate the "relative phase shift" between the recovered signals of components $f_1$ and $f_2$.

In the present application of the invention $f_1$=600 Hz. and $f_2$=3 $f_1$=1800 Hz. As seen previously, one can obtain a first order correction by modifying the phase of the carrier applied to the demodulator, this being done by acting on the carrier phase shift parameter so as to eliminate (or reduce to a minimum) the relative phase delay of signals $f_1$ and $f_2$ as recovered after demodulation.

Figure 2:
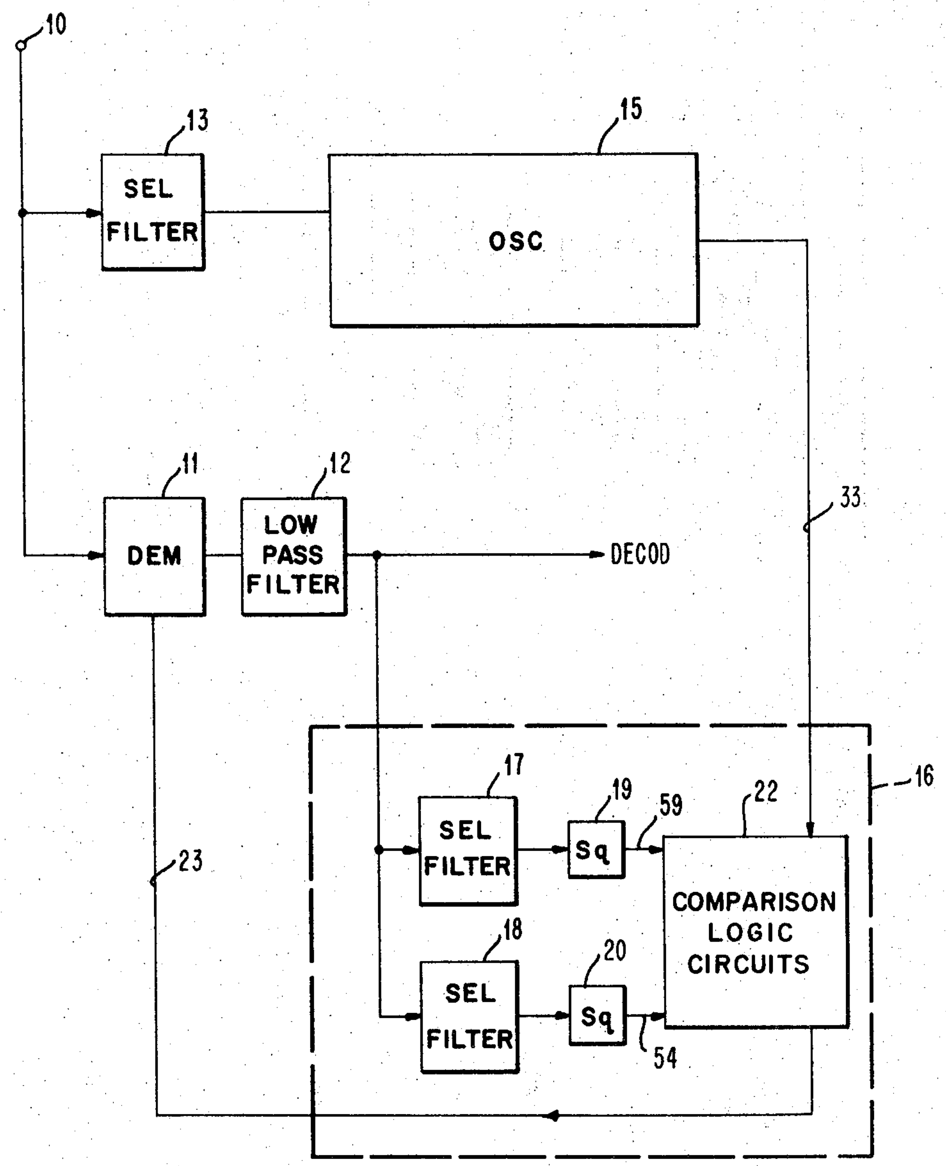

The device schematically represented in FIG. 2 determines the relative delay of $f_1$ and $f_2$, indicates whether or not the relative delay is in "the minimum permitted zone," indicates whether $f_2$ is ahead of, or behind $f_1$, and allows shifting of the carrier phase by steps (of $\pi/4$ or $\pi/8$ in the present example) either in an advancing or a retarding direction before the regenerated carrier is applied to the demodulator. The input end of the receiver has been shown to make the description easier to follow. The signal is received at input 10 and is passed to Demodulator 11 which is followed by a low-pass filter 12. The received signal on input 10 also goes to a circuit which permits recovery of the carrier and which, in the general case where the carrier is transmitted as part of the signal is made up of a selection (band pass) filter 13. Filter 13 is followed by an assembly 15 comprising, for example, a phase lock oscillator which provides the reference and time base signals necessary for operation of the receiver.

Figure 3:
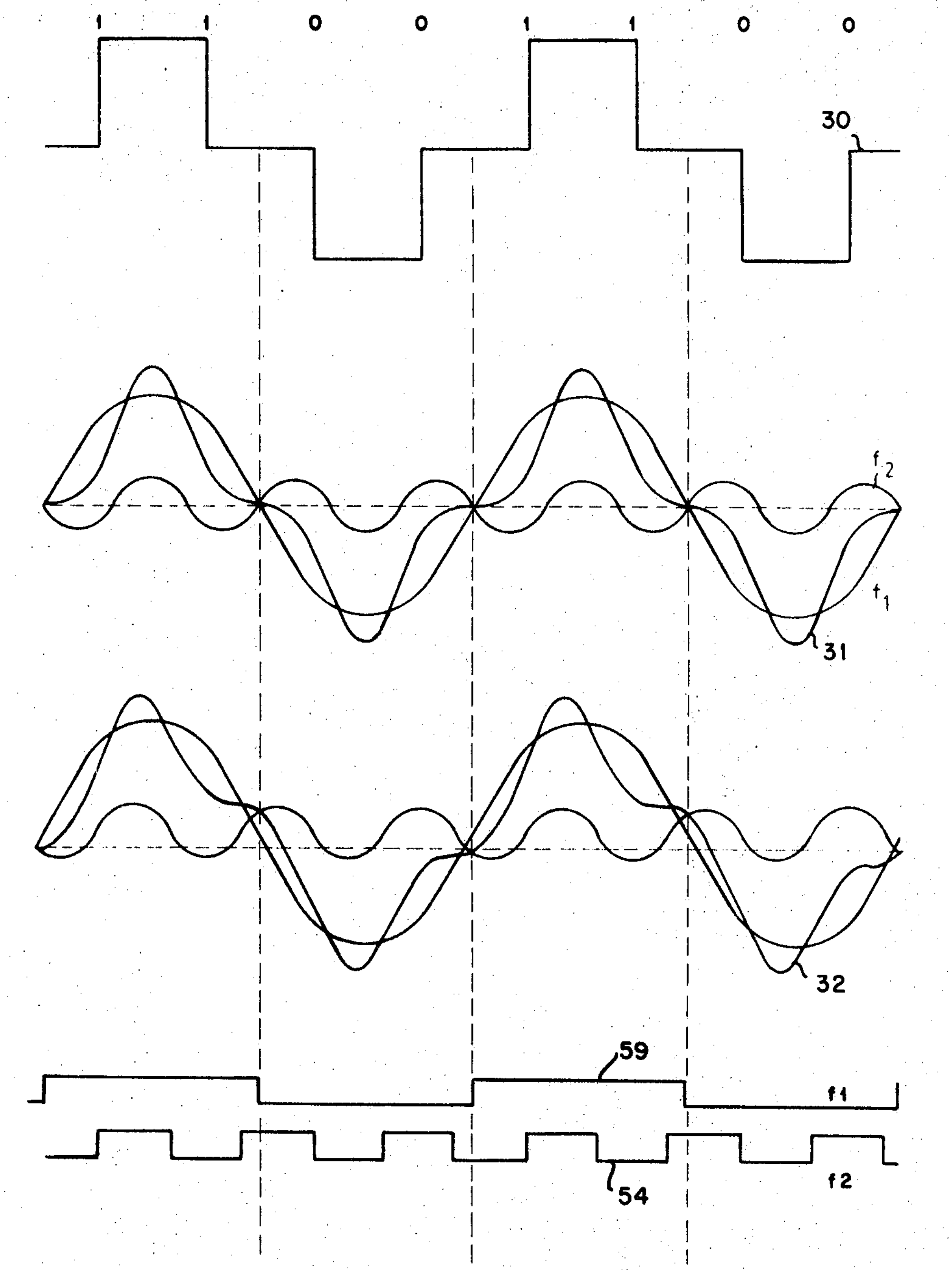

In block 16, we have the rephasing devices which comprise principally two selection filters 17 and 18 isolating $f_1$ and $f_2$ (in the present case, 600 and 1800 Hz.). There is no phase shift imposed since these frequencies are their own tuning frequencies. Filters 17 and 18 are each followed by a squaring device 19 and 20 and the squared signals are combined in the rephasing and comparison logic circuits 22. The rephased clock signal from circuits 22 is transmitted by lead 23 to demodulator 11. Circuits 22 may be variously implemented in different technologies and only two of the better embodiments will be described hereafter. FIG. 3 illustrates on line 30 a type of data signal to be transmitted; on line 31 the signal as theoretically received and on line 32 the effective signal actually received. The signal of line 30 is only an example but in its particular case, it represents a signal selected specifically so that its two main components are $f_1$ and $f_2$. In most communications a synchronization signal will be sent before a message and a signal of type on line 30 presents certain characteristics which are sharp enough for it to be used in synchronization and, simultaneously, for rephasing the carrier. This is, for example, the case when the data to be transmitted are coded in accordance with a pulse/echoes mode such as the mode described in U.S. Pat. application Ser. No. 662,203 filed by Jean-Marc Pierret on Sept. 12, 1967, and now U.S. Pat No. 3,523,291 issued Aug. 4, 1970, entitled Data Transmission System, and assigned to the assignee of this application.

FIRST EMBODIMENT

Figure 4:
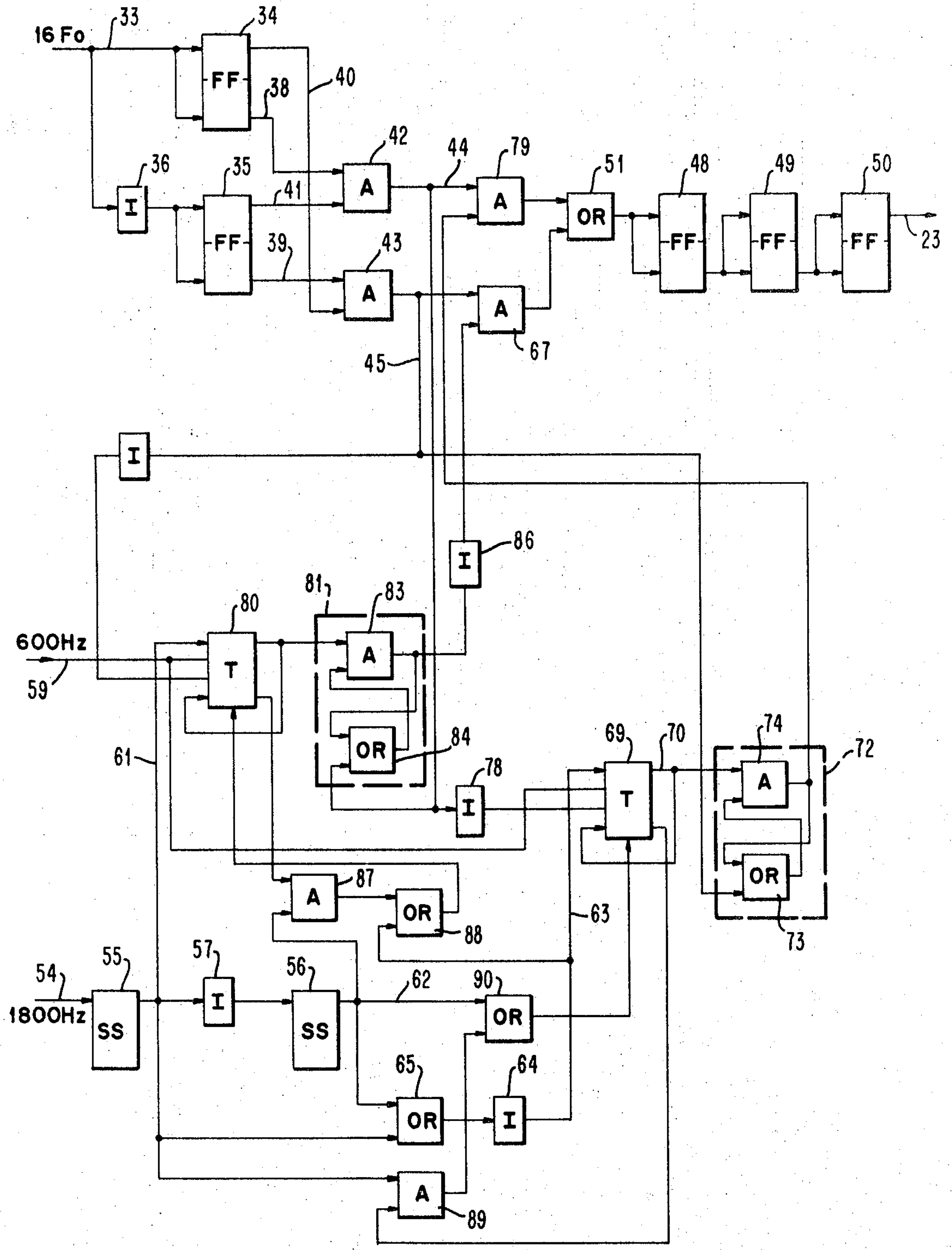
Figure 5A:
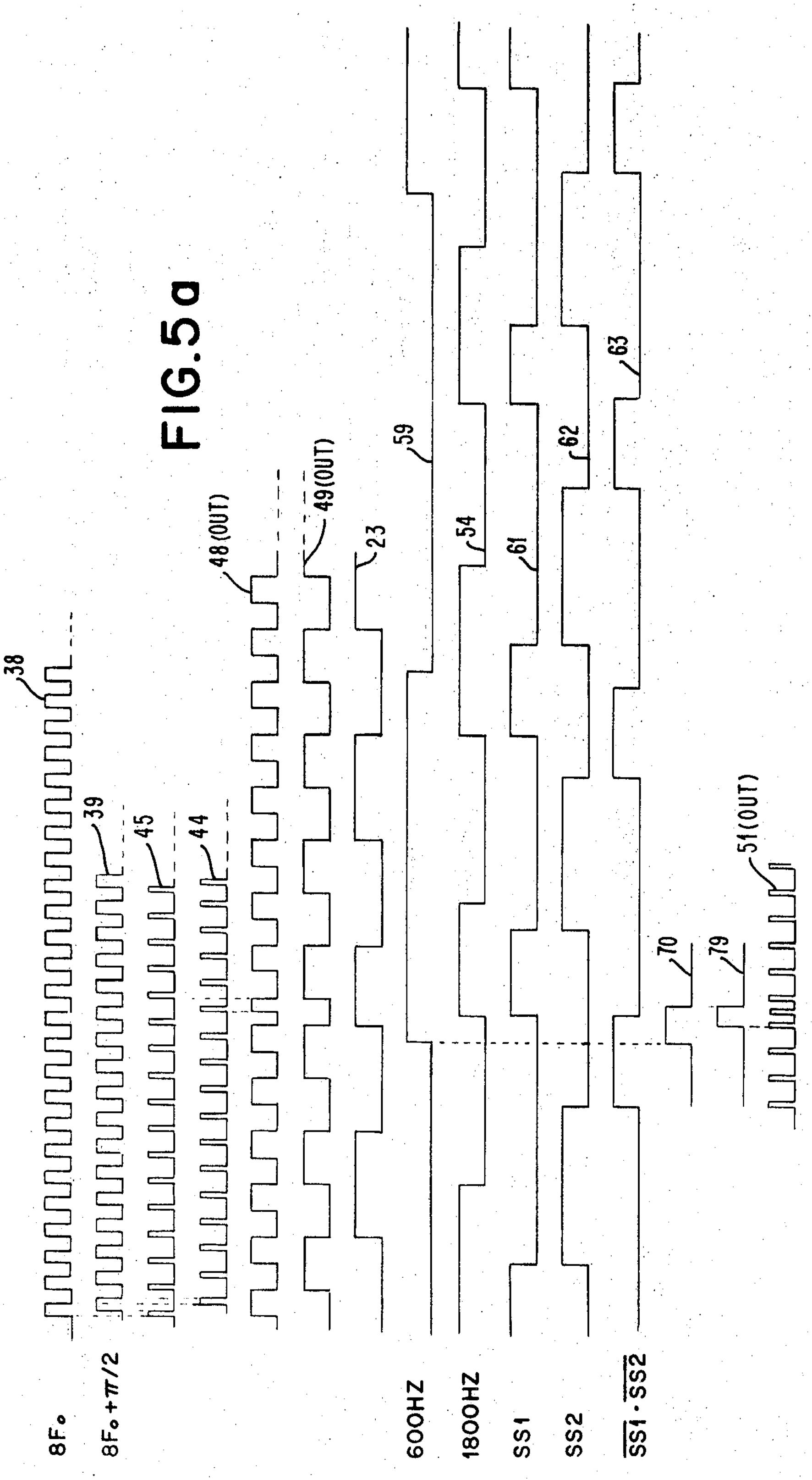
Figure 5B:
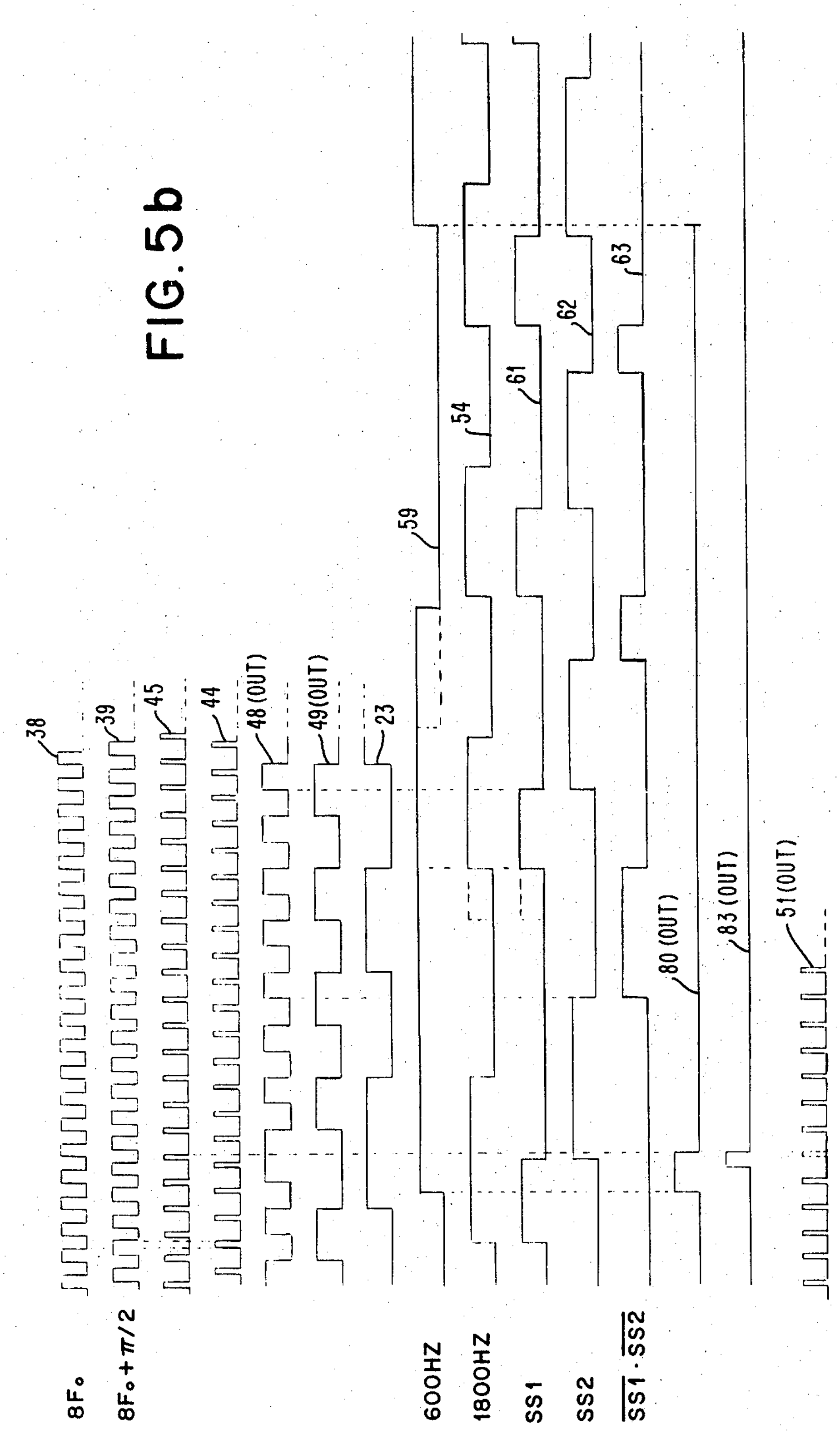

FIG. 4 illustrates one possible embodiment of the circuits 22 of FIG. 2 and FIGS. 5*a*, and 5*b* are possible phase relationships therein. FIG. 5*a* gives the timing diagram in the situation where $f_2$ (1800 Hz. in the present case) as received is leading $f_1$ (600 Hz. in the present case), while FIG. 5*b* gives the timing diagram for the case where $f_2$ is lagging behind $f_1$. Oscillator 15, FIG. 2, provides on its output 33, a frequency equal to 16 $F_0$, $F_0$ being the carrier signal (2800 Hz. in the present case). Flip-flop 34 receives the oscillator signal directly and flip-flop 35 receives the oscillator signal from line 33 through an inverter 36. These flip-flops 34 and 35 respond to only one direction of transition of the input signals and provide on their respective outputs 38 and 39, 8 $F_0$ and 8 $F_0$ shifted by $\pi/2$ (8 $F_0+/2$ on the FIGS. 5*a* and 5*b*). Outputs 40 and 41 provide the complements of these signals.

AND circuits 42 and 43 receive the output signals on lines 38 and 41 and lines 39 and 40 respectively and supply on their respective output lines 44 and 45 the interspersed series of pulses as shown on FIGS. 5*a* and 5*b*. The group of flip-flop 48, 49, and 50 are connected in series as a frequency divider and receive through an input OR circuit 51, the pulses to be counted and provide on their output 23, the rephased carrier frequency $F_0$ which is sent on to Demodulator 11, FIG. 2. The positive going transitions of the 1800 Hz. frequency from squarer 19, FIG. 2, as shown on line 54, FIG. 3, switch single-shot 55 the restoration of which switches single-shot 56 through an inverter 57. These two circuits determine three time windows SS1, SS2, $\overline{SS1}.\overline{SS2}$ (see FIGS. 5*a* and 5*b*) on lines 61, 62, and 63 respectively. Line 63 is the output of an inverter 64 supplied through OR circuit 65 with the output pulses of single shots 55 and 56. If the positive going transition of the squared 600 Hz. signal on line 59 occurs in window SS2, the device is considered to be correctly phased within the permissible range. If the transition occurs in window SS1, the 1800 Hz. frequency is considered to be lagging behind the 600 Hz. frequency as shown on FIG. 5*b*. If the rising portion of this 600 Hz. frequency occurs in windows $\overline{SS1}\cdot\overline{SS2}$, the 1800 Hz. frequency is deemed to be leading the 600 Hz., as shown on FIG. 5*a*. During normal in-phase operation, flip-flop 48 is controlled through OR circuit 51, by pulses on line 45 from AND 43 passing through AND 67.

Referring now to FIG. 5*a*, it can be seen that when $f_1$ is leading $f_2$ the positive transition of the squared 600 Hz. frequency on line 59 switches on a trigger 69 having an output 70 since at this time window $\overline{SS1}.\overline{SS2}$ is open and line 62 is on. The following pulse on line 45 switches on latching trigger 72 which comprises OR circuit 73 and AND circuit 74, which remains set until the resetting through inverter 78 of trigger 69 by the fall of the next pulse on line 44. The ON state of AND 74 opens an AND circuit 79 which then allows a pulse on line 64 to pass into OR 51 causing an extra step of flip-flop 48. This additional switching of flip-flop 48 causes a time advance in the switching of flip-flop 49 and 50 which in the present embodiment will cause a forward shift by $\pi/4$ of the carrier output on line 23. This causes a $\pi/4$ forward shift of the demodulated 600 and 1800 Hz. frequencies which, in the time domain allows the 600 Hz. to catch up with the 1800 Hz. With the phase relationship indicated in FIG. 5*a*, this catching up is sufficient to rephase both frequencies to within the allowable range of divergence and the following positive transition of the squared 600 Hz. signal occurs in window SS2. If the rephasing had been inadequate, a second operation would have taken place at the next positive transition of the 600 Hz. signal. It must be noted that the carrier is rephased by these operations to the nearest 180° of its phase, i.e. to either the correct phase or one 180° away from it. If we assume that the carrier is out of phase by $\pi$, the 600 Hz. and the 1800 Hz. signals are both changed in phase by the same $\pi$: the 1800 Hz. still appears in advance of the 600 Hz. and the rise of the latter still occurs in window $\overline{SS1}.\overline{SS2}$. The detection and the working of the rephasing device are the same, but the phase correction is taken at a different transition of the 600 Hz. signal on line 59. The ambiguity of $\pi$ in the carrier phasing is easily removed if a synchronization sequence is used (see FIG. 3). It is sufficient to terminate this sequence by three consecutive and identical values to indicate that the sequence is ended and that the carrier is correctly phased if these three values are recovered. If the inverse of these three values are recovered, it is an indication that the carrier is out of phase by $\pi$ in which case an inverter may be placed in the data output.

FIG. 5*b* is similar to FIG. 5*a* but relates to the timing where the 1800 Hz. lags with respect to the 600 Hz. frequency. The operation is generally similar but uses a trigger 80 and a latching trigger 81 comprising AND circuit 83, and OR circuit 84. The positive transition of the squared 600 Hz. signal on line 59 now occurs in window SS1 (line 61) thus switching on trigger 80. The next pulse on line 44 switches on trigger 81 which will be reset together with trigger 80 at the end of the succeeding pulse on line 45. With the AND circuit 83 conducting, inverter 86 is turned off to block AND circuit 67 so that the next pulse on line 45 does not go through it and the switching of the flip-flop 48 and therefore the switching of flip-flop 49 and 50, is delayed. This causes a $\pi/4$ lagging phase shift of the carrier on line 23, and therefore an identical phase shift of the 600 and 1800 Hz. signals. In the time domain, the 1800 Hz. frequency therefore catches up on the lag it has with respect to the 600 Hz. As indicated in FIG. 5*b*, this is sufficient to obtain a rephasing within the desired limits of accuracy. It should also be noted that the detection of an excessive out of phase condition may be made at the end of a window SS1, line 61 or $\overline{SS1}.\overline{SS2}$ line 63. It may therefore be necessary to keep a trigger circuit working slightly longer than indicated and/or to also prevent the operation of other circuits. These various safety measures are provided for trigger 80 by AND 87 and OR 89 which gate the trigger to allow it to set when $\overline{SS1}.\overline{SS2}$ is high or to hold it set so long as SS2 is on and are provided for trigger 69 and AND circuit 89 and by OR circuit 90.

SECOND EMBODIMENT

Figure 6:
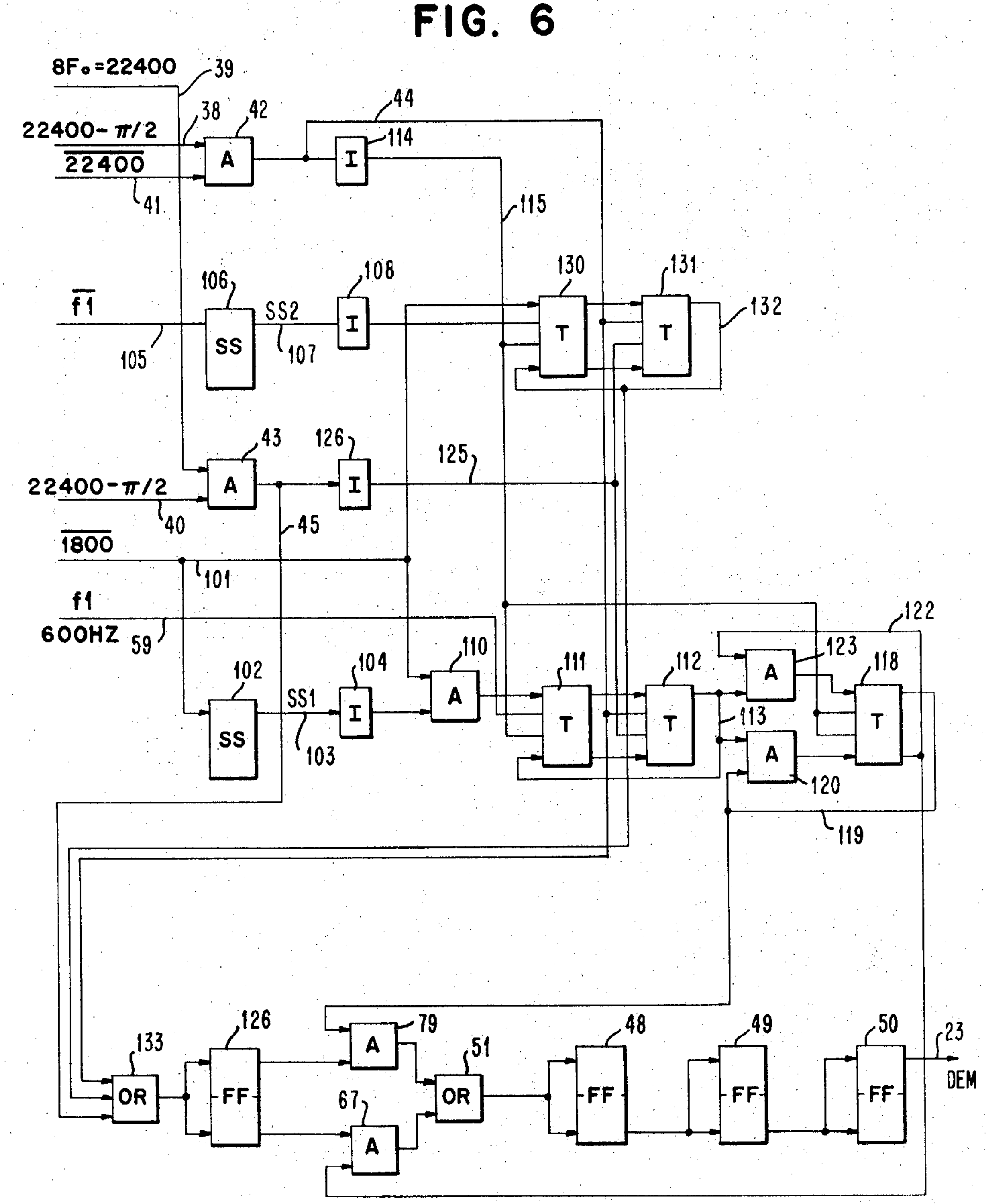
Figure 7A:
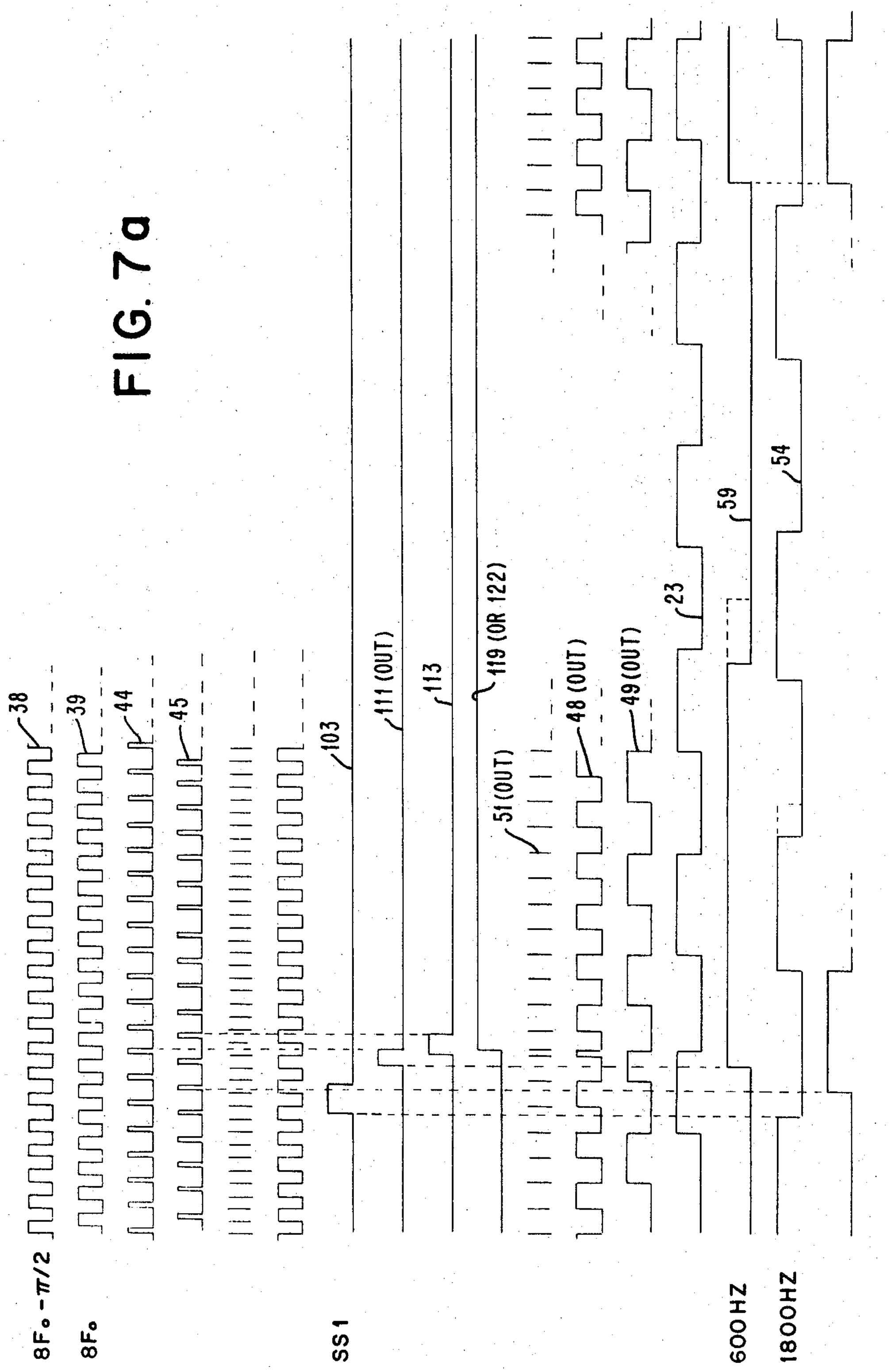

FIG. 6 shows another example of circuits 22. FIG. 7*a* represents the waveform relationships corresponding to a lead of the 1800 Hz. frequency with respect to the 600 Hz., while FIG. 7*b* corresponds to a lag of the 1800 Hz. with respect to the 600 Hz.

From a frequency 16 $F_0$ issued from oscillator 15, the structure of FIG. 4 is utilized to provide the signals 8 $F_0$ and 8 $F_0$ shifted by $-\pi/2$ (8 $F_0-\pi/2$ on the FIGS.) on lines 39 and 38 respectively and their respective complements on lines 41 and 40. As in FIG. 4, AND circuits 42 and 43 provide interspersed pulses on their output lines 44 and 45. The group of flip-flops 48, 49, and 50 provides the rephased carrier at the output 23 of flip-flop 50. The complement of the 1800 Hz. frequency is an input on line 101 and switches single-shot 102 on the drop of the squared 1800 Hz. signal to provide a time window SS1 on the output 103 of the single shot 102. Inverter 104 is driven by signal SS1. If the positive transition of the 600 Hz. signal on line 59 occurs in window SS1, the 1800 Hz. frequency leads the 600 Hz., but is within the permitted limits, but if the rise of the 600 Hz. occurs after the fall of SS1, the phase shift is too great. The rise of the complement of the 600 Hz. signal, line 105 turns on a single shot 106 to provide a time window SS2 on the output 107 of the single shot 106. The output of single shot 106 is inverted in an inverter 108. If the rise of the 1800 Hz. frequency occurs in window SS2, the 1800 is lagging behind the 600 Hz. but is within the permissible limits. If the rise of 1800 occurs after the fall of SS2, the phase difference is too great.

Referring now to FIG. 7*a*, the 600 Hz. frequency rises while the output of an AND 110 is high, for both inputs of AND 110 are high since the 1800 Hz. frequency is low and SS1 has fallen thereby raising the output of inverter 104. This rise of the 600 Hz. causes the setting of trigger 111 and the next pulse on line 44 then causes the setting of trigger 112. With trigger 112 set, and its output on line 113 high, the fall of the pulse on line 44 is inverted in inverter 114 to bring up line 115 which will reset trigger 111. A trigger 118 has its set output line 119 returned to an AND 120 on its reset input and its reset output 122 returned to an AND 123 on its set input. With output line 113 high, one of the AND's 120 and 123 will be conductive to prime the trigger 118 so that the next rise of line 115 will change the state of trigger 118. Trigger 118 remains in its new state because trigger 112 was reset when the next pulse on line 125, which is line 45 inverted in inverter 126, went down. Before the change of state of trigger 118, flip-flop 48 was controlled by a series of pulses from one output of a flip-flop 126 passing through the AND 67 or 79 which is primed by the high one of the outputs 119 or 122. After the change of state of trigger 118, flip-flop 48 is controlled by the pulses from the other output of flip-flop passing through the other AND circuit 67 or 79. There is therefore a phase advance in the switching of flip-flop 48, and thus in that of triggers 49 and 50 also, whereby the carrier is advanced in phase by $\pi/8$. This phase advance is the same for the 1800 and 600 Hz. frequencies, allowing the 600 Hz. to catch up on the lead of the 1800 Hz. In the time relationship of FIG. 7*a* this angle phase advance is sufficient to obtain a rephasing within the required accuracy.

Figure 7B:
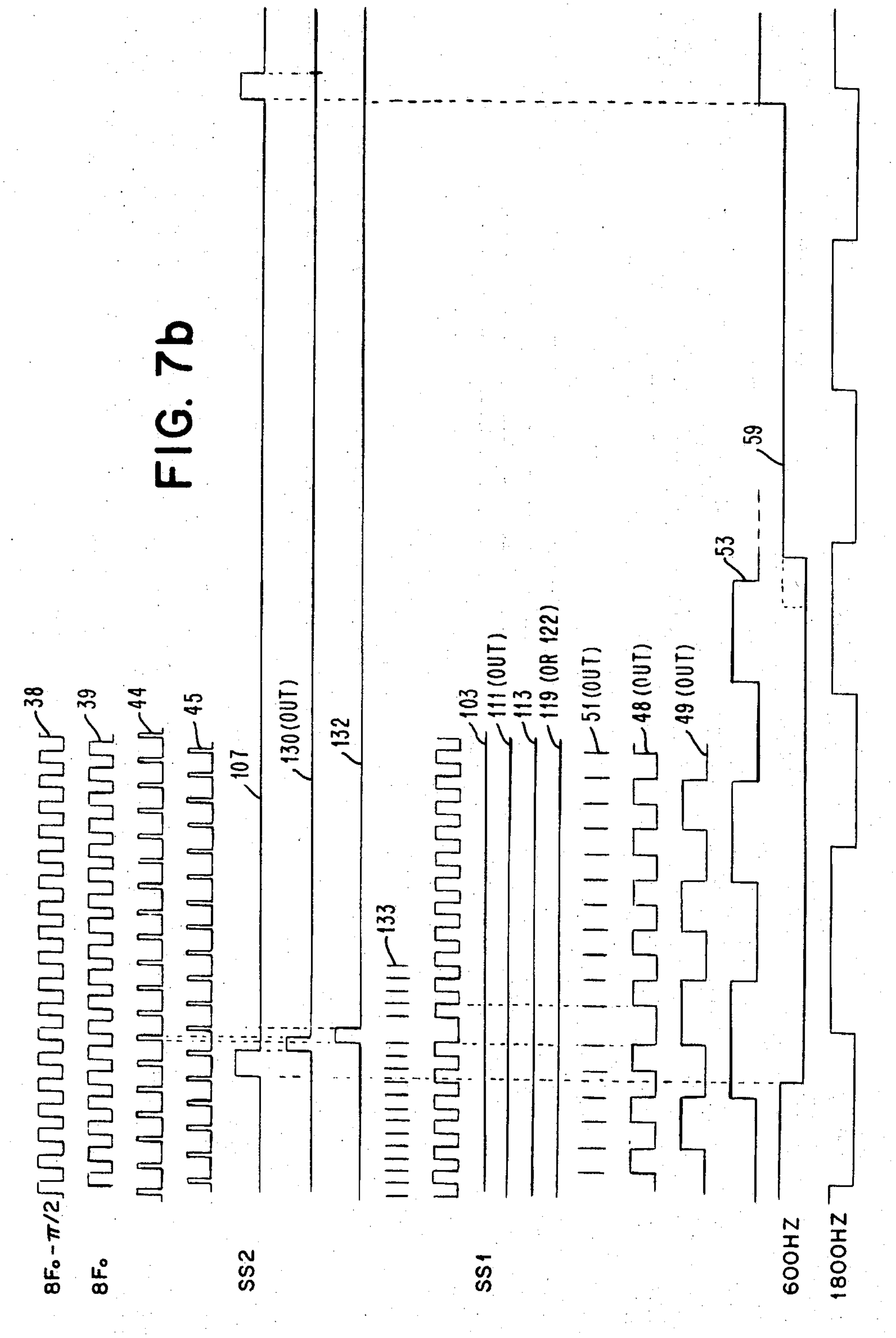

In the phase relationship shown in FIG. 7*b*, the 1800 Hz. lags the 600 Hz. and when the output of inverter 108 goes positive after SS2 on line 107 falls, the rise of the complement of 1800 Hz. on line 101 sets trigger 130 which allows the immediately following pulse on line 44 to set trigger 131. The set output of trigger 131 on line 132 will prime trigger 130 to be reset when the pulse on line 115 rises and the resetting of trigger will allow the next pulse on line 125 to reset trigger 131. Thus trigger 131 will be set for only one oscillator cycle. The pulse inputs to flip-flop 126 are those on lines 44 and 45 and pass through a flip-flop input OR 133. When trigger 131 is set, its high output on line 132 masks OR circuit 133 to cover up the rise of a pulse on line 45 so that flip-flop 126 which is switched by the series of pulses from OR 133 (see FIG. 7*b*) thus misses one input pulse. Since it is the changes of state of flip-flop 126 which controls the change of state of flip-flop 48 so long as trigger 118 remains in one condition, the missed input pulse from OR 133 causes a delay in the change of state of flip-flop 48 and therefore a similar delay in the changes of flip-flops 49 and 50 whereby the carrier on lead 23 has been changed in phase by a lag of $\pi/8$, a phase change which is reflected onto the 1800 Hz. and the 600 Hz. and allows the 1800 to catch up on the 600. In the timing shown on the FIG. 7*b*, this was sufficient to obtain rephasing within the required limits.

While the invention has been particularly shown and described with reference to preferred embodiments thereof, it will be understood by those skilled in the art that the foregoing and other changes in form and details may be made therein without departing from the spirit and scope of the invention.

I claim:

1. In a communications system of the type transmitting a representation of a carrier signal and one side band of the result of the modulation of said carrier signal by an information signal including at least a pair of pilot signals which are integrally harmonically related, have a fixed phase relationship and are respectively at substantially the upper and lower frequency limits of said information signal, a signal receiver including the combination of:

- a filter to separate said carrier signal from said signal after reception in said receiver;
- a pulse generator connected to said filter to generate a fixed number of pulses for each cycle of said separated carrier signal;
- a counter driven by said pulses to provide a demodulating carrier signal;
- gates controllable to pass an additional pulse from the pulse generator to said counter or to block transmission of a pulse thereto to change the phase of said demodulating carrier by a fixed increment;
- a demodulator controlled by said demodulating carrier signal and by said received signal to provide a demodulated information signal;
- means to individually filter said pair of pilot signals from said demodulated information signal;
- phase comparing means for said filtered pair of pilot signals to determine their relative phase shift; and
- gate control circuits controlled by said phase comparing means whenever said relative phase shift exceeds a predetermined shift to adjust the phase of said demodulating carrier signal to minimize said relative phase shift.

2. The invention as set forth in claim 1 including a pair of trigger circuits in said gate control circuits, one to control said gates to pass an additional pulse from the pulse generator to said counter and the other to block transmission of a pulse, a pair of single shot circuits, a first triggered by one type of signal transitions in the higher frequency one of said pilot signals and the other by timing out of said first single shot whereby three time periods are indicated in each cycle of said higher frequency pilot signal and connections from said single shot circuits to said triggers to gate one or the other of said trigger circuits if one type of signal transition of said lower frequency pilot signal occurs in particular ones of said time periods.

3. The invention as set forth in claim 1 including a pair of trigger circuits in said gate control circuits, one to control said gates to pass an additional pulse from the pulse generator to said counter and the other to block transmission of a pulse, a first control trigger set if one type of signal transition occurs in one of said pilot signals more than a predetermined time after a signal transition in the other of said pilot signals, a second control trigger set if said one type of signal transition occurs in the other of said pilot signals more than a predetermined period after a signal transition in the one of said pilot signals and means responsive to said pulse generator to reset any set ones of said trigger circuits.